United States Patent [19]

Speiser et al.

[11] 3,900,721

[45] Aug. 19, 1975

[54] SERIAL-ACCESS LINEAR TRANSFORM

[75] Inventors: Jeffrey M. Speiser; Harper John Whitehouse, both of San Diego, Calif.

[73] Assignee: The United States of America as represented by the Secretary of the Navy, Washington, D.C.

[22] Filed: Feb. 14, 1974

[21] Appl. No.: 442,530

[52] U.S. Cl. .............................................. 235/156
[51] Int. Cl. .......................................... G06f 15/34
[58] Field of Search........... 235/156, 152; 324/77 R, 324/77 B, 77 D, 77 G, 77 H; 179/15 BC

[56] References Cited

UNITED STATES PATENTS 3,742,201 6/1973 Groginsky .......................... 235/156
3,792,355 2/1974 Miyata et al. .................. 179/15 BC

OTHER PUBLICATIONS

G. D. Bergland, "FFT Hardware Implementations – An Overview" IEEE Trans. on Audio & Electroacustics, Vol. AU-17, No. 2, June 1969, pp. 104–108.

*Primary Examiner*—Malcolm A. Morrison
*Assistant Examiner*—David H. Malzahn
*Attorney, Agent, or Firm*—Richard S. Sciascia; Ervin F. Johnston; John Stan

[57] ABSTRACT

A serial-access linear transform device, suitable for signal processing systems requiring the rapid generation of linear transforms of a spatial or temporal signal, where the transform is in sampled form consisting of a series of N-sample terms, each term consisting of factors, and where the signal consists of a series of N-sample pulses. The transform device includes a time code generator which generates a plurality of pulses, either singly or sequentially, at predetermined intervals of time, and serves as a clocking and synchronizing source for the transform device, and a data source for providing the signal which is to be processed into the form of a linear transform.

A first read-only N-sample memory is synchronized by the time-code generator, the memory containing information regarding one of the factors of the series of N-sample terms of the linear transform. A first multiplier, whose two inputs are the outputs of the data source and the first read-only memory, multiplies the two inputs.

A second read-only N-sample memory is synchronized by the time-code generator, this memory also containing information regarding factors of the series of N-sample terms of the linear transform.

A cross-correlator may comprise: (1) a first N-sample shift register, whose input is the output of the first multiplier, which provides a useful output when the N stages are filled; (2) a second shift register, substantially identical to and synchronized with the first shift register, having as its input the output of the second read-only memory; (3) a plurality of N shift-register (S-R) multipliers connected between corresponding stages of the two shift registers, the totality of S-R multipliers serving to cross-correlate the contents of the two shift registers; and (4) a signal summer, whose inputs are the outputs of the N S-R multipliers, having as its output a sequence of terms each of which is a factor of the final sequence of terms in the linear transform.

A third read-only memory, substantially similar to the first and second read-only memories, stores the final necessary factors for the sequence of terms in the linear transform. A second multiplier, whose inputs are the outputs of the signal summer and of the third read-only memory, has as its output the desired sequence of terms of the linear transform.

6 Claims, 7 Drawing Figures

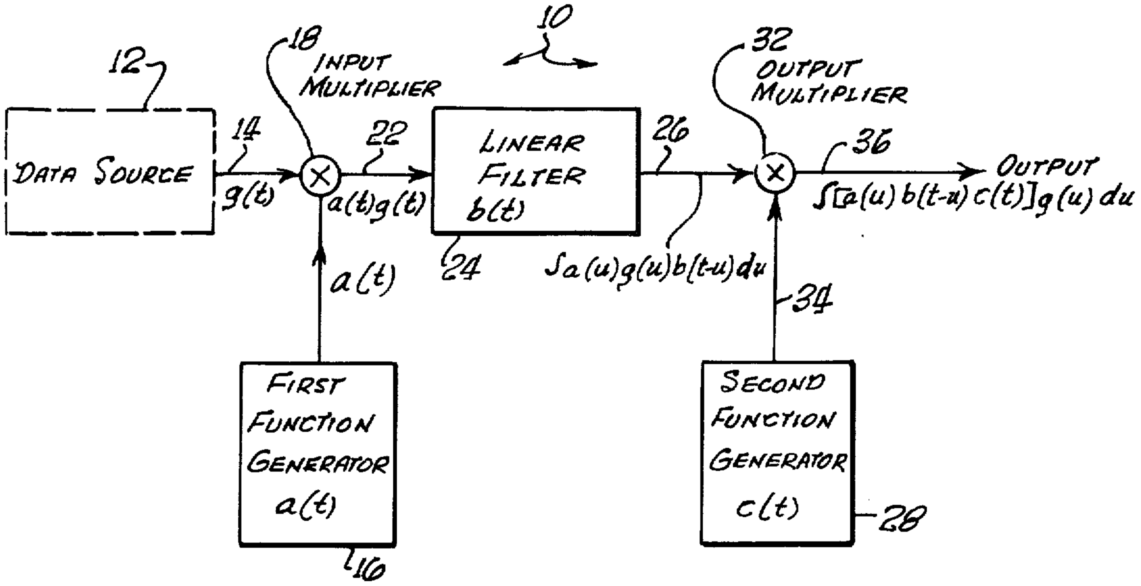
FIG. 1. SERIAL-ACCESS APPARATUS FOR THE GENERATION OF A LINEAR TRANSFORM (FILTER FORM)
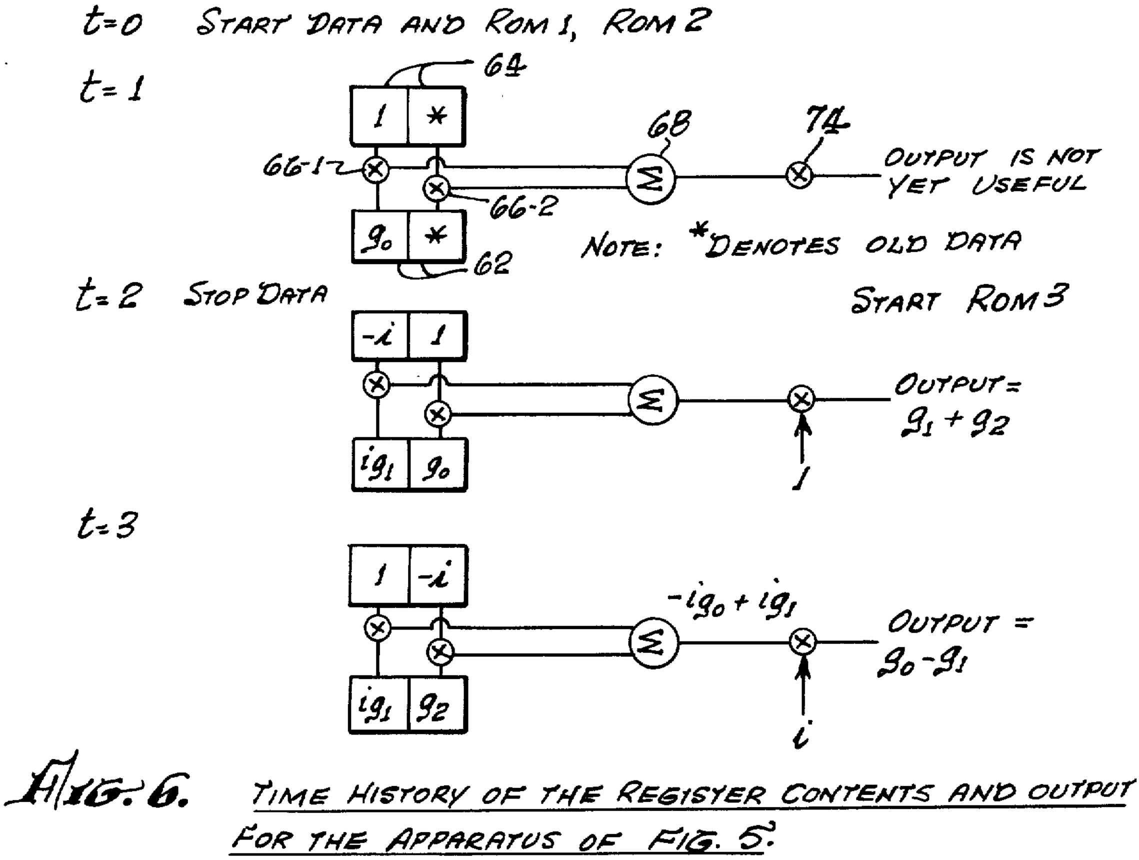
FIG. 6. TIME HISTORY OF THE REGISTER CONTENTS AND OUTPUT FOR THE APPARATUS OF FIG. 5.

SERIAL-ACCESS APPARATUS FOR THE GENERATION OF A LINEAR TRANSFORM (CORRELATOR FORM)

SERIAL-ACCESS LINEAR TRANSFORM APPARATUS CONFIGURED TO PERFORM A LENGTH-TWO HADAMARD TRANSFORM.

TIME HISTORY OF THE FILTER CONTENTS AND APPARATUS OUTPUT FOR A LENGTH THREE SERIAL-ACCESS FOURIER TRANSFORM APPARATUS USING THE STRUCTURE OF FIG. 1.

TIME HISTORY OF THE REGISTER CONTENTS AND OUTPUT FOR A LENGTH THREE SERIAL ACCESS DISCRETE FOURIER TRANSFORM APPARATUS USING THE CORRELATOR FORM

APPARATUS FOR OBTAINING THE DISCRETE FOURIER TRANSFORM (DFT), VIA THE CHIRP-Z TRANSFORM (CZT) ALGORITHM, WITH PARALLEL IMPLEMENTATION OF COMPLEX ARITHMETIC

SERIAL-ACCESS LINEAR TRANSFORM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many problems of signal processing, beam forming, and image transmission require the rapid generation of linear transforms of a spatial or temporal signal. The most commonly required transforms are the Fourier transform, the discrete Fourier transform, and the Hadamard transform. Other frequently used transforms include the Laplace transform, the Z-transform, and the Mellin transform. The purpose of the apparatus of this invention is to rapidly perform such linear transforms with small lightweight special-purpose hardware.

In the prior art, the above transforms were generally implemented on large, heavy, expensive, general-purpose digital computers at rates which are too slow for many real-time signal processing requirements. Alternatively, Fourier transforms have been implemented optically, but such optical implementations have a severe interface problem, rendering it extremely difficult to use them in conjunction with other signal processing elements. The Fourier transform has also been implemented by banks of filters, and by Fast Fourier Transform hardware. The filter bank method is bulky and expensive because of the large number of filters required. Single multiplier FFT implementations produce discrete Fourier transform samples at a rate which is still slow compared to the multiplier's through-put rate. Multiple multiplier FFT structures are very expensive and difficult to configure. In addition, all of the above implementations except the general-purpose digital computer are limited to performing essentially a single fixed type of transform.

One of the primary advantages of this invention is the speed with which the chosen transform is generated for a given multiplier speed. The implementation may also be very light in weight and low in power consumption if an acoustic transversal filter is used as the linear filter. Another implementation is highly compatible with other digital signal processing equipment, particularly since it permits operation to be interrupted without losing data.

Compared to other Fourier analyzers using linear filters or cross-correlators, this invention needs far fewer linear filters (one complex or four real) or requires only a single pass through the correlator, rather than one pass for each frequency.

The hardware is modular in structure, and longer transform lengths may be obtained by combining modules requiring only the relatively low cost of additional read-only memories. Even the latter "overhead cost" may be avoided if the read-only memories are programmable.

SUMMARY OF THE INVENTION

The invention relates to serial-access linear transform apparatus, suitable for signal processing systems requiring the rapid generation of linear transforms of a spatial or temporal signal, where the transform is in sampled form consisting of a series of N-sample terms, and where the signal consists of a series of N-sample pulses, comprising of a time code generator which generates a plurality of pulses, either singly or sequentially, at predetermined intervals of time, and serves as a clocking and synchronizing source for the transform apparatus. A data source provides the signal which is to be processed into a linear transform, the output of the data source being the function $g(t)$. A first function generator generates a function $a(t)$. A first multiplier, whose two inputs are the outputs $g(t)$ and $a(t)$ of the data source and the first function generator, multiplies the two inputs, the output of the multiplier being $a(t)g(t)$. A linear filter, having an impulse response $b(t)$, has as its input the output signal, $a(t)g(t)$, of the first multiplier and as its output the signal $\int a(u)g(u)b(t-u)du$.

A second function generator generates the function $c(t)$. A second multiplier has as its inputs the outputs of the linear filter and of the second function generator, and as its output the desired sequence of terms of the linear transform, namely $\int \{a(u)b(t-u)c(t)\}g(u)du$.

OBJECTS OF THE INVENTION

An object of the invention is to provide a linear transform device capable of the rapid generation of linear transforms of a spatial or temporal signal.

Another object of the invention is to provide a linear transform device which contains fewer linear filters than similar prior art devices.

Yet another object of the invention is to provide a linear transform device which is modular in structure.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a schematic diagram showing serial-access apparatus for the generation of a linear transform in filter form.

FIG. 6 is a schematic diagram showing the time history of the register contents and output for the apparatus for FIG. 5.

DESCRIPTION OF THE PREFERRED EMBODIMENTS

Figure 2:
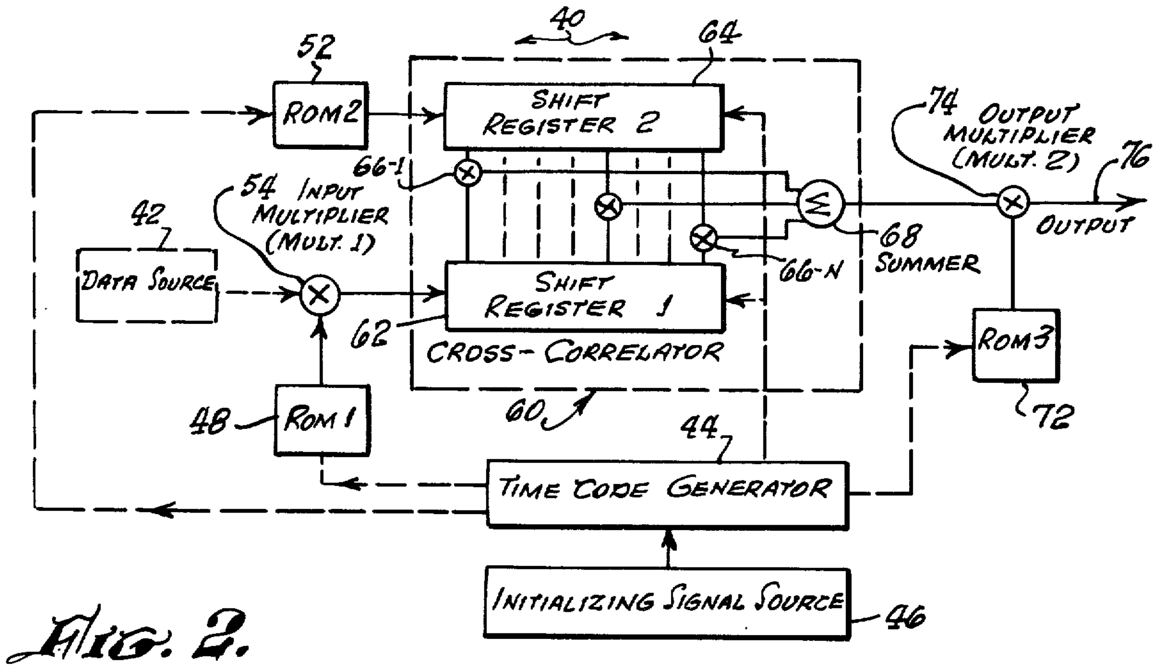
FIG. 2 is a schematic diagram showing serial-access apparatus for the generation of a linear transform in correlator form.

Referring now to the figures, and beginning with FIG. 1, this figure illustrates a serial-access linear transform apparatus 10, suitable for signal processing systems requiring the rapid generation of linear transforms of a spatial or temporal signal, where the transform may be in sampled form consisting of a series of N-sample terms. The signal may consist of a series of N-sample pulses, or may be an analog signal. A data source 12 provides the signal which is to be processed into a linear transform. The output 14 of the data source 12 may be labelled as the function $g(t)$. The data source 12 is shown dotted inasmuch as it is external to the rest of the apparatus 10. The input data, handled by data source 12, could be either analog or pulse-type, for example sample pulses, or a pulse train. A first function generator 16 generates a prescribed function $a(t)$, at its output 18. An input multiplier, 18 whose two inputs are the outputs, $g(t)$ and $a(t)$, of the data source 14 and the first function generator multiplies the two inputs, the output 22 of the multiplier being $a(t)g(t)$. A linear filter 24, having an impulse response b(t), has as its input the output signal 22, $a(t)g(t)$, of the input multiplier 18 and as its output 26 the signal $\int a(u)g(u)b(t-u)du$.

A second function generator 28 generates the function $c(t)$.

Restrictions on the form of the functions $g(t)$, $a(t)$ and $c(t)$ are discussed hereinbelow.

Means for clocking the function generators 16 and 28 have not been shown because it can be done in at least two different ways. They may be clocked independently of the data source 12, in which case the function generator 16 generating $a(t)$ and the function generator 28 generating function $c(t)$ are started with an appropriate delay between the two. An alternative method is to let the incoming signal itself trigger both function generators, 16 and 28. An output multiplier 32, whose inputs are the outputs, 26 and 34, of the linear filter 24 and of the second function generator 28 has as its output 36 the desired sequence of terms of the linear transform, namely $\int \{a(u)b(t-u)c(t)\}g(u)du$.

In a specific implentation of the transform apparatus 10, shown in FIG. 1, the function $a(t)$ corresponds to the sequence $W^0$, $W^{0.5}$, . . . , $W^{0.5(N-1)^2}$, where $W = e^{-12\pi/N}$; the function c(t) corresponds to the same sequence and the linear filter 24 has discrete impulse response $b(t)$ equal to $W^0$, $W^{-0.5}$, $W^{-0.5(2)^2}$, . . . , $W^{-0.5(2N-2)^2}$, in reversed order. More explicitly, $a_n = e^{-i\pi n^2/N} = c_n$, for $n=0, 1, \ldots N-1$, and $b_n = e^{i\pi n^2/N}$ for $n = (N-1), \ldots, (N-1)$. Alternatively, the linear filter 24 may have impulse response $b(t) = W^{-0.5(N-1)^2}, \ldots, W^0, W^{-0.5(N-1)^2}$. In this case $a(t) = c(t) = W^0, W^{0.5}, W^{0.5(2)^2}, \ldots, W^{0.5(N-1)^2}$.

The transform apparatus 10 may be so configured that the linear transform generated is a Hadamard transform.

In the transform apparatus 10, the linear filter 24 may be an acoustic surface wave device and the function generators, 16 and 28, may be serial-access memories.

Referring now to FIG. 2, this figure shows a serial-access linear transform apparatus 40 suitable for signal processing systems requiring the rapid generation of linear transforms of a spatial or temporal signal, where the transform is in sampled form consisting of a series of N-sample terms, and where the signal from data source 42 consists of a series of N-sample pulses. The transform apparatus 40 includes a time code generator 44, which generates a plurality of pulses, either singly or sequentially, at predetermined intervals of time, and serves as a clocking and synchronizing source for the transform apparatus.

An initializing signal source 46, whose output is connected to the time-code generator 44, is a control source which generates pulses which command the time-code generator 44 to control the timing signals for the generation of a complete set of operating cycles of the transform. It does not contain any data information.

In another type of transform apparatus 40, where the operation is triggered by the signal from data source 42, the initializing signal source 46 would not be required. The data source 42, similar in function to the data source 12 shown in FIG. 1, accepts the signal which is to be processed into a linear transform.

A first read-only N-sample memory 48, synchronized by the time-code generator 44, contains information regarding one of the factors of the series of N-sample terms of the linear transform. A second read-only N-sample memory 52, synchronized by the time-code generator 44, also contains information regarding factors of the series of N-sample terms of the linear transform. An input multiplier 54, whose two inputs are the outputs of the data source 42 and the first read-only memory 48, multiplies the two inputs.

A cross-correlator 60 comprises a first N-sample shift register 62, whose input is the output of the input multiplier 54, and which provides a useful output when the N stages are filled; and a second shift register 64, substantially identical to and synchronized with the first shift register, whose input is the output of the second read-only memory 52. A plurality of N shift-register (S-R) multipliers, 66-1 through 66-N, are connected between corresponding stages of the two shift registers 62 and 64, the totality of S-R multipliers serving to cross-correlate the contents of the two shift registers. The cross-correlator 60 also includes a signal summer 68, whose inputs are the outputs of the N S-R multipliers, 66-1 through 66-N, and whose output is a sequence of terms each of which is a factor of the final sequence of terms in the linear transform.

A third read-only memory 72, substantially similar to the first and second read-only memories, 48 and 52, stores the final necessary factors for the sequence of terms in the linear transform.

An output multiplier 74 has as inputs the outputs of the signal summer 68 and of the third read-only memory 72, and has as its output 76 the desired sequence of terms of the linear transform.

Referring again to time code generator 44, the generator is more sophisticated in function than a clock because the three read-only memories, 48, 52 and 72, are not started at the same time. Essentially, it sends out a series of pulses, uncoded. More specifically, what it does is send out a start pulse for each of the read-only memories, in the form of one pulse or a series of pulses, depending on the type of read-only memory. In the simplest form, it would send out one pulse to each of them, at the appropriate time.

Discussing the invention now qualitatively in more detail, the data source 12 is typical to the signal which is going to be processed. The data source 12 may comprise a coded signal, or any kind of a signal that one might want to take a Fourier transform of.

With respect to the type of read-only memories, 48, 52, and 72 used, as is generally true in a read-only memory, the information in it is never destroyed. The read-only memory only has to be set up once to generate one fixed function. For example, a read-only memory could be applied to a set of sine functions or cosine functions. Read-only memories may be bought off the shelf nowadays.

There are also programmable read-only memories that can be set up with any kind of function, basically with a cost that depends on how fast it must operate and how many signal samples and how many bits of quantization are required for each sample. Typically, they are programmed by fusing fuseable links. In other words, a read-only memory may be obtained that will produce any function desired, but then it has to be programmed by melting small links appropriately with an applied programming signal.

In this invention, the kind of information which is stored in the read-only memories 48, 52 and 72 are complex chirps, that is discrete linear FM signals having real and imaginary values. The three complex chirps are of two different lengths, the one for read-only memory 2 being approximately twice as long as the ones for read-only memories 48 and 72, which are of exactly the same length. More specifically, read-only memories 48 and 72 are of the same length as the block of signal that is going to be analyzed, which in turn is of the same length as the two shift registers, 62 and 64.

The chirp signal from read-only memory 48 mixes with the data from data source 12 in the input multiplier 54, multiplying the two together, to result in the product of a chirp signal and data from the data source 42. This product signal is transmitted into the first shift register 62, until the first shift register is completely loaded. Then information ceases entering the first shift register 62, for as many pulses as corresponds to its length. In other words, assume that the signal length is N, that is, comprises N complex samples. Then, the signals from the data source 42 and the read-only memory 48 are multiplied and shifted N times, until shift register 62 is completely loaded. While this is transpiring, data from read-only memory 52 is shifting into shift register 64. The two shift registers 62 and 64 do not have to be synchronously loaded. It is only the subsequent operations that have to be synchronous. After shift registers 62 and 64 are both loaded, data will be dropping off the right hand side of both shift registers 62 and 64. But, each time that a shift is made, each time that the outputs from read-only memories 48 and 52 go into shift registers 62 and 64 and shift, after the first time that it is loaded, that is the time when the useful data starts to come out. The product of the two shift registers 62 and 64 is being summed in summer 68, and the output then goes into the output multiplier 74. So, at the same time that shift registers 62 and 64 have been completely loaded, then read-only memory 72 starts. So, as the first useful data point comes out, it gets multiplied by the first output of read-only memory 72, and that produces the final output 76, and so on for N time intervals.

For simplicity of discussion, suppose that both shift registers 62 and 64 and all of the read-only memories 48, 52 and 72, are operating at the same speed. Then for N time intervals, shift register 62 and shift register 64 are being loaded, and nothing useful is coming out. Then for another N time intervals, an output flows from read-only memories 52 and 72, and from input multiplier 54, and useful transform outputs are obtained from output multiplier 74. So, half the time something useful is being computed, and half the time is wasted in loading operations. As shown in FIG. 2, the shift registers 62 and 64 are clocked by the time code generator 44.

The cross-correlator 60 may be a complex cross-correlator, that is, one capable of processing complex terms. However, complex cross-correlators are known in the art, and a specific structure is not shown in FIG. 2. For example, one way to build the complex multiplier 66-N is with four real multipliers. The specific structure of the two shift registers 62 and 64 would depend upon how one would want to store the data, and they would have to be two complex shift registers. A "brute force" way of doing it would be to make each of the complex shift registers 60 and 62 out of two real ones. Then four multipliers, for each of N multipliers, 66-1 through 66-N, shown, would be required.

In the transform apparatus 40 shown in FIG. 2, the cross-correlator 60 may be an acoustic surface-wave correlator, with a time-serial input and output at data rates compatible with the data rates of the two multipliers, 54 and 74, and the three read-only memories, 48, 52 and 72.

Discussing now more theory behind the invention, the operation of the invention is most easily seen by observing the transformations which a signal undergoes as it propagates from point 14 to point 36 of FIG. 1. The transformations will be described for continuous signals and function generators, 16 and 28, but they apply equally well with a minor change in notation for discrete sequences.

If the output of the data source 12 at point 14 is $g(t)$, and the first function generator 16 generates a signal $a(t)$, then the output of the first or input multiplier 18 at point 22 is $a(t)g(t)$. The output of the linear filter 24 at point 26 is $\int a(u)\, g(u)\, b(t-u)\, du$. Finally, the output of the second or output multiplier 32 at point 36 is $c(t) \int a(u)\, g(u)\, b(t-u)\, du$ or $\int \{a(u)\, b(t-u)\, c(t)\} g(u)\, du$. That is, the apparatus 10 of FIG. 1 performs a linear, time-varying, transformation or integral transform with kernel $k(t,u) = a(u)\, b(t-u)\, c(t)$.

If the data source 12 and function generators 16 and 28 produce discrete sequences $g_n$, $a_n$, $c_n$, respectively, and the linear filter 24 has impulse response sequence $b_n$, the corresponding discrete result is obtained wherein the output at point 36 at time $n$ is $\Sigma_s\, a_s\, b_{n-s}\, c_n\, g_s$, or the matrix corresponding to the discrete transform is $a_s\, b_{n-s}\, c_n$.

Any transform whose kernel has the required factorization may be implemented by either the structure 10 shown in FIG. 1, or the structure 40 shown in FIG. 2, in which the filter 24 has been replaced by a cross-correlator 60 and function generator. For discrete time implementations, the function generators would be implemented as read-only memories, 48, 52 and 72 as shown. For either of the apparatuses, 10 or 40, shown in FIGS. 1 and 2, the processing time required to perform the transform is linear in the data block length, and the cost is nearly a linear function of the desired transform length.

The implementation 10 of FIG. 1 is preferred if power dissipation is an important consideration, since the linear filter 24 may be a passive device such as an acoustic surface wave filter or a magnetostrictive delay-line filter. On the other hand, the implementation 40 shown in FIG. 2 allows greater freedom in inexpensively changing the transform implemented, since with this implementation, changing the transform requires only a change of read-only memories, 48, 52 and 72, or equivalent function generators.

As discussed briefly hereinabove, if complex transforms are required, the necessary function generators, multipliers, and filters can be obtained as combinations of the corresponding real elements. Details of the combinations are discussed, and drawings shown, by G. W. Byram, J. M. Alsup, J. M. Speiser, and H. J. Whitehouse, in the report entitled *Signal Processing Device Technology*, Proceedings of the NATO Institute on Signal Processing, Loughborough, England, August 1972, pp.457–476, edited by J. W. R. Griffiths ET AL, Academic Press, 1973.

To determine the read-only memories and/or filter response required to implement a discrete Fourier transform using the implementations of FIG. 1 or FIG. 2, the discrete Fourier transform decomposition previously used as a computational algorithm called the "Chirp Z-transform Algorithm" is used. This is described by Bernard Gold, and Charles M. Rader, in their book entitled *Digital Processing of Signals*, published by McGraw-Hill Book Co. New York, 1969, pp.213–215. Another reference is L. R. Rabiner, et al *The Chirp Z-transform Algorithm*, IEEE Transactions on Audio and Electroacoustics, Volume AU-17, June 1969, pp. 86–92.

The discrete Fourier transform is defined as $$G_k = \sum_{n=0}^{N-1} W^{nk} g_n \text{ where } W = e^{-i2\pi/N};$$

This may be rewritten as $$G_k = W^{-0.5k^2} \sum_{n=0}^{N-1} (g_n W^{-0.5n^2})\, W^{0.5(n+k)^2}$$

$$\text{or } G_k = W^{0.5k^2} \sum_{n=0}^{n-1} (g_n W^{0.5n^2})\, W^{-0.5(n-k)^2}$$

Since the above equation may be interpreted as decomposing a discrete Fourier transform into a premultiplication by a complex chirp, a correlation or convolution with a complex chirp, and a postmultiplication by a complex chirp, the required sequence generators or filters may be obtained from this equation by inspection.

Figure 3:
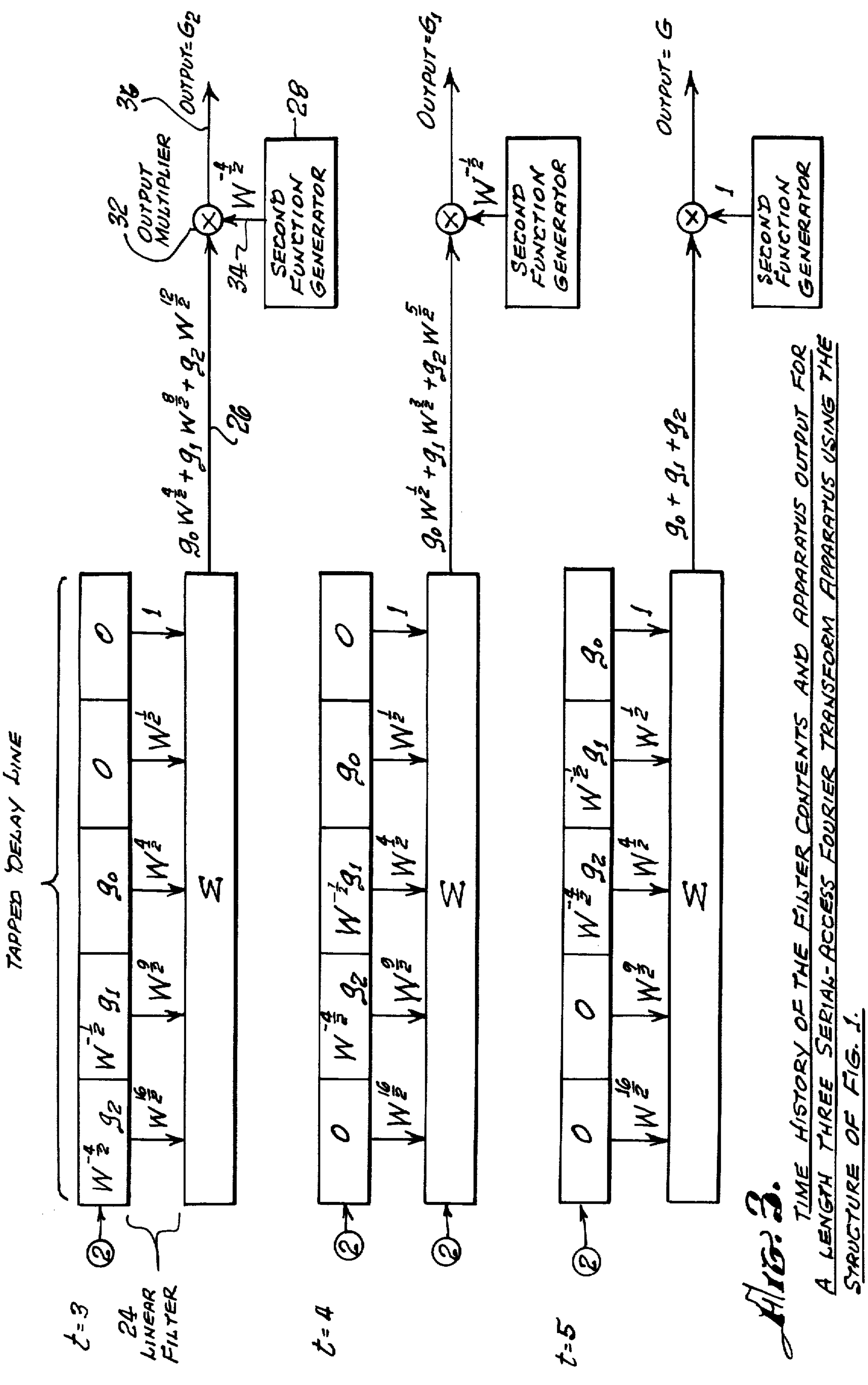
FIG. 3 is a schematic diagram showing the time history of the filter contents and apparatus output for a length-three serial-access Fourier transform apparatus using the structure of FIG. 1.
Figure 4:
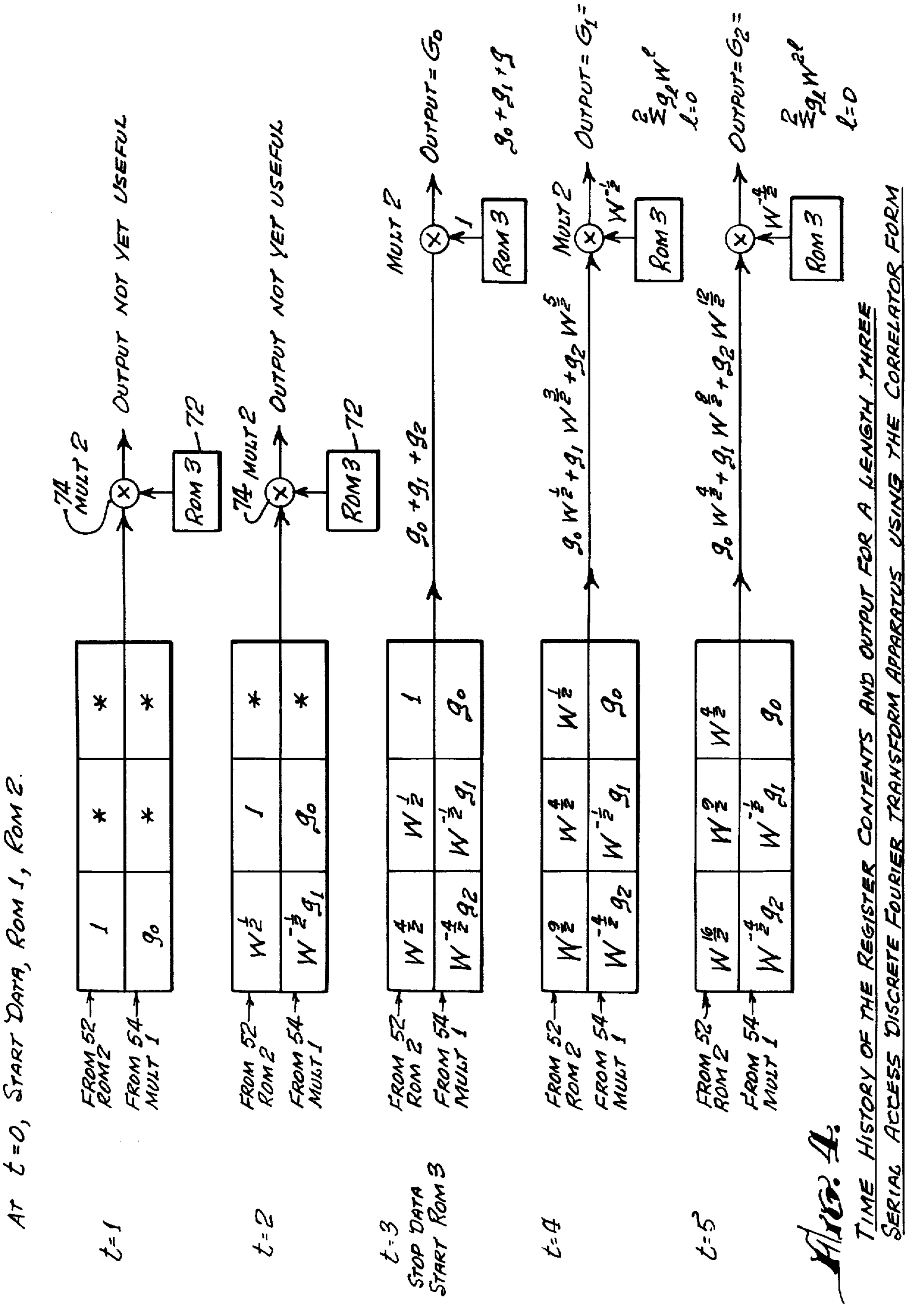
FIG. 4 is a schematic diagram showing the time history of the register contents and output for a length-three serial-access discrete Fourier transform apparatus using the correlator form.

For the implementation 10 of FIG. 1, the linear filter has discrete impulse response $W^0$, $W^{0.5}$, $W^{0.5(2)^2}$ . . . , $W^{0.5(2N-2)^2}$ in reversed order, and each of the function generators produces the sequence $w^0$, $W^{-0.5}$, . . . , $W^{-0.5(N-1)^2}$, where the first function generator 16, generating the function $a(t)$, generates this sequence in forward order, and the second function generator 28 generates it in reversed order. With this configuration, the output of the discrete Fourier transform is generated in descending index order: $G_{N-1}$, $G_{N-2}$ . . . , $G_1$, $G_0$. This is illustrated for a length-3 discrete Fourier transform in FIG. 3. Time samples at times 1 and 2 are not illustrated because the filter 24 is still loading and no useful output is produced until time sample 3. It is to be noted that between data blocks of length N, blocks of length N filled with zeros must be placed, so that the apparatus 10 or 40 outputs useful transform samples during N successive data shifts, and then outputs a function of only part of the data block during the next N data shift.

To obtain the transform in increasing index order, $G_0$, $G_1$, . . . , $G_{N-1}$, the filter impulse response would be $W^{-(N-1)^2/2}$, . . ., $W^0$, . . ., $W^{-(N-1)^2/2}$. In this case, both function generators would need to produce $W^0$, $W^{0.5}$, . . . , $W^{0.5(N-1)^2}$. An embodiment corresponding to this case has been built, since it allows the two function generators to be identical.

For the structure 40 of FIG. 2 to perform a discrete Fourier transform (illustrated for length 3 in FIG. 3), the first read-only memory 48 (or other sequence generator) must output $W^0$, $W^{-0.5}$, . . . $W^{-0.5(N-1)^2}$ in forward order. The same output in reversed order is needed from read-only memory 72, starting at time $t = N$ units. The output of the second read-only memory 52 is $W^0$, $W^{0.5}$, . . . $W^{05.(2N-2)^2}$.

Figure 5:
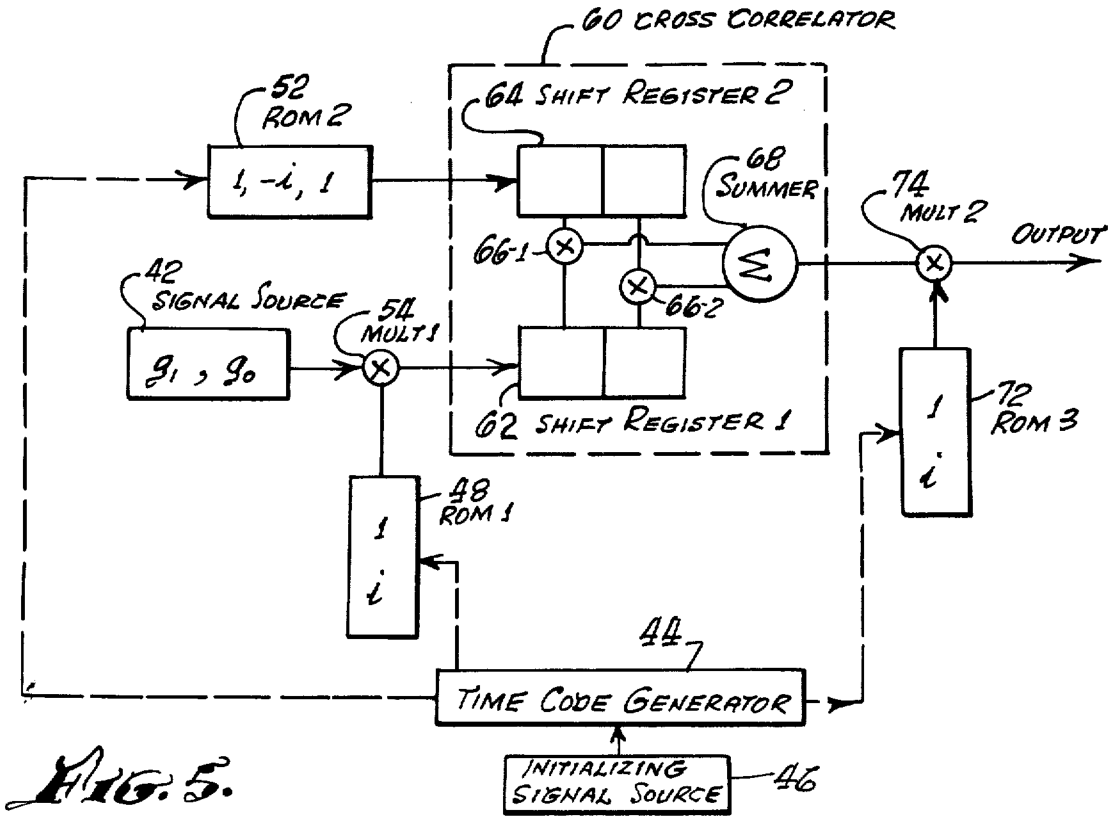
FIG. 5 is a schematic diagram showing a serial-access linear transform apparatus which is configured to perform a length-two Hadamard transform.

As stated hereinabove, the structure 10 of FIG. 1 or 40 of FIG. 2 may be used to perform a Hadamard transform. For example, if the block length is N=2, the corresponding implementation is shown in FIG. 5, and its time-history is shown in FIG. 6.

A Hadamard transform array is essentially a multiplication by a Hadamard matrix, that is, multiplying a vector by a Hadamard matrix. The components of the Hadamard matrix form a complete orthonormal basis. The matrix multiplication is a row by row multiplication of the column vector by the rows of the Hadamard matrix, so that each of the multiplications is like taking the inner product or finding a generalized Fourier coefficient. Hadamard transforms are very commonly used in image processing.

Figure 7:
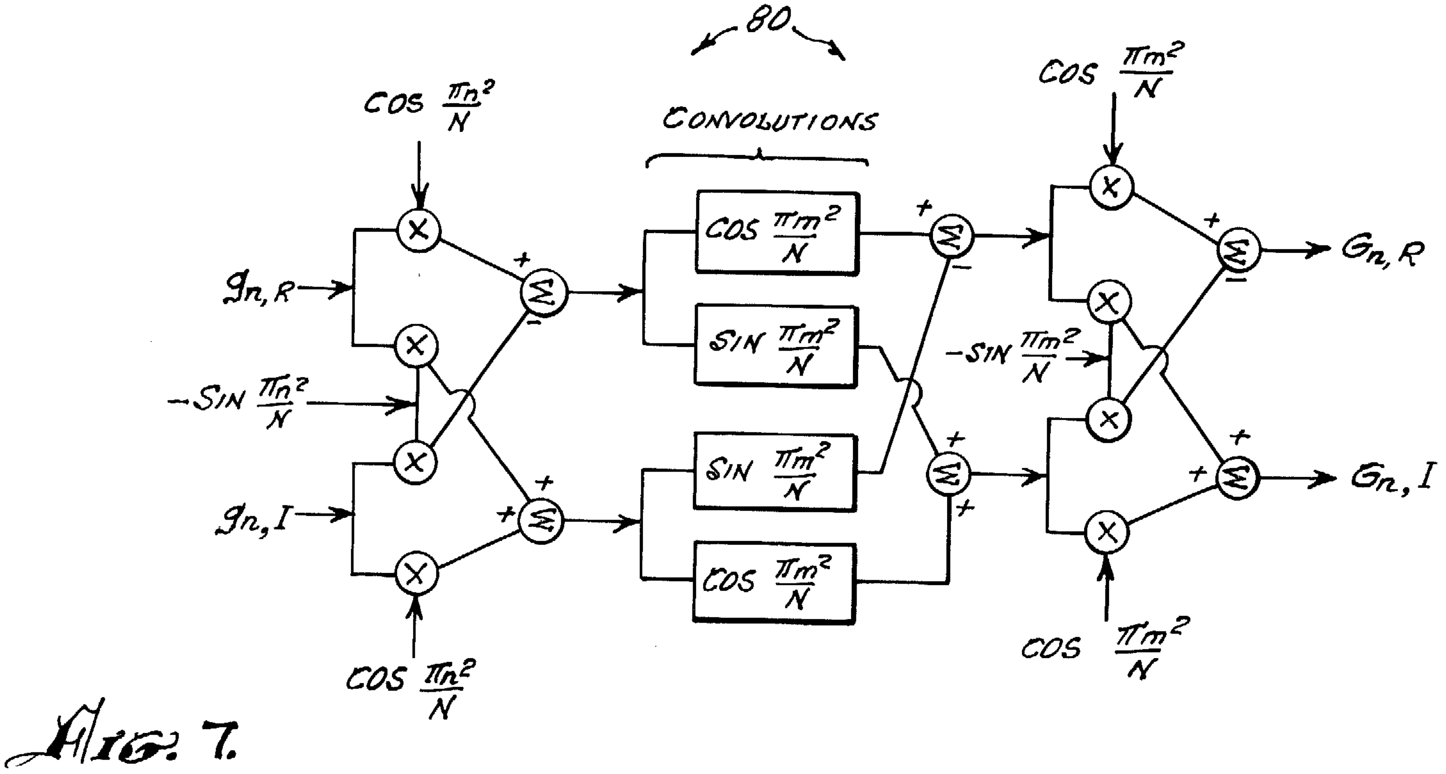
FIG. 7 is a schematic diagram showing an apparatus for obtaining the discrete Fourier transform (DFT) via the chirp-Z transform (CZT) algorithm, with parallel implementation of the complex arithmetic.

In FIG. 7 is shown an implementation actually built of the discrete Fourier transform decomposed via the CZT algorithm, and implemented with the parallel form of the complex arithmetic. The basic equation involved is:

$$G_m = \sum_{n=0}^{N-1} e^{-i2\pi mn/N} g_n = e^{-i\pi n^2/N} \sum_{n=0}^{N-1} e^{+i\pi(m-n)^2/N}\, e^{-i\pi n^2/N} g_n;$$

The complex operations that it is desired to implement, involve the parameters:

$$a_n = c_n = e^{-i\pi n^2/N} \quad \text{for} \quad n = 0, \ldots N-1$$

$$b_n = e^{+i\pi m^2/N} \quad \text{for} \quad \begin{cases} m = -(N-1), \ldots, (N-1) \text{ if convolution is used} \\ m = 0, \ldots N-1 \text{ if circular convolution is used} \end{cases}$$

If the data vector dimension N is even, then $b_{m+N} = b_m$, and a circular convolution of length N may be used in place of the convolution of length 2N−1.

FIG. 7 as well as other pertinent information appears in Appendix D, entitled "High Speed Serial Access Linear Transform Implementations," described in the *ARPA Quarterly Technical Report*, dated Mar. 1, 1973 - June 1, 1973, and published by the Naval Undersea Center, San Diego, California 92132.

The filter 24 used in the implementation 10 of FIG. 1 may be an acoustic surface wave device, a magnetostrictive delay-line filter, or any other tranversal filter. The function generators 16 and 28 may be read-only memories, other serial-access memories, or active function generators such as digital recursive sequence generators.

The cross-correlator 60 used in the structure of FIG. 2 may be a large scale integrated (LSI) digital correlator, an acoustic surface-wave correlator, or any other cross-correlator with time-serial input and output at data rates compatible with the multipliers and read-only memories.

Obviously many modifications and variations of the present invention are possible in the light of the above teachings. It is therefore to be understood that within the scope of the appended claims the invention may be practiced other than as specifically described.

What is claimed is:

1. A serial-access linear transform apparatus, suitable for signal processing systems requiring the rapid generation of linear transforms of a spatial or temporal signal, where the transform is in sampled form consisting of a series of N-sample terms, and where the signal consists of a series of N-sample pulses, comprising:
  - a data source, for providing the signal which is to be processed into a linear transform, the output of the data source being the function $g(t)$;
  - a first function generator, which generates a function $a(t)$;
  - an input multiplier, whose two inputs are the outputs, $g(t)$ and $a(t)$, of the data source and the first function generator, for multiplying the two inputs, the output of the multiplier being $a(t)g(t)$;
  - a linear filter having an impulse response $b(t)$, whose input is the output signal, $a(t)g(t)$, of the input multiplier and whose output is the signal $\int a(u)g(u)b(t-u)\,du$;
  - a second function generator, which generates the function $c(t)$;
  - an output multiplier, whose inputs are the outputs of the linear filter and of the second function generator, and whose output is the desired sequence of terms of the linear transform, namely $\int \{a(u)b(t-u)c(t)\}g(u)\,du$.

2. The transform apparatus according to claim 1, wherein
  - the function $a(t)$, generated by the first function generator, corresponds to the sequence $W^0, W^{0.5}, \ldots, W^{0.5(N-1)^2}$, where $W = e^{-i2\pi/N}$;
  - the function $c(t)$ corresponds to the same sequence [W]; and the linear filter has discrete impulse response $[W^0, W^{0.5}, W^{0.5(2)^2}, \ldots, W^{0.5(2N-2)^2}$, in reverse order$]\ e^{-i\pi n^2/N}$, for $n=-(N-1), \ldots, (N-1)$.

3. The transform according to claim 2, wherein the linear filter is an acoustic surface wave device; and the function generators are serial-access memories.

4. A serial-access transform apparatus, suitable for signal processing systems requiring the rapid generation of linear transforms of a spatial or temporal signal, where the transform is in sampled form consisting of a series of N-sample terms, each term consisting of factors, and where the signal consists of a series of N-sample pulses, comprising:
  - a time code generator which generates a plurality of pulses, either singly or sequentially, at predetermined intervals of time, and serves as a clocking and synchronizing source for the transform apparatus;
  - an initializing signal source, whose output is connected to the time-code generator, which generates pulses which control timing signals for the generation of a complete set of operating cycles of the transform;
  - a data source, for accepting the signal which is to be processed into the form of a linear transform;
  - a first read-only N-sample memory, synchronized by the timecode generator, the memory containing information regarding one of the factors of the series of N-sample terms of of the linear transform;
  - a first input multiplier, whose two inputs are the outputs of the data source and the first read-only memory, for multiplying the two inputs;
  - a second read-only $(2N-1)$-sample memory, synchronized by the time-code generator, this memory also containing information regarding factors of the series of N-sample terms of the linear transform;
  - a cross-correlator comprising:
    - a first N-sample shift register, whose input is the output of the input multiplier, and which provides a useful output when the N stages are filled;
    - a second shift register, substantially identical to and synchronized with the first shift register, whose input is the output of the second read-only memory;
    - a plurality of N shift-register (S-R) multipliers, connected between corresponding stages of the two shift registers, the totality of S-R multipliers serving to cross-correlate the contents of the two shift registers;
    - a signal summer, whose inputs are the outputs of the N S-R multipliers, and whose output is a sequence of terms each of which is a factor of the final sequence of terms in the linear transform;
  - a third read-only memory, substantially similar to the first and second read-only memories, which stores the final necessary factors for the sequence of terms in the linear transform;
  - a second output multiplier, whose inputs are the outputs of the signal summer and of the third read-only memory, and whose output is the desired sequence of terms of the linear transform.

5. The transform apparatus according to claim 4, wherein
  - the cross-correlator is an acoustic surface-wave correlator with time-serial input and output at data rates compatible with the data rates of the two multipliers and the three read-only memories.

6. The transform apparatus according to claim 4, wherein the cross-correlator is a complex cross-correlator.

* * * * *